A. PURVIS.
Ice Velocipede.
No. 93,833.  Patented Aug. 17, 1869.
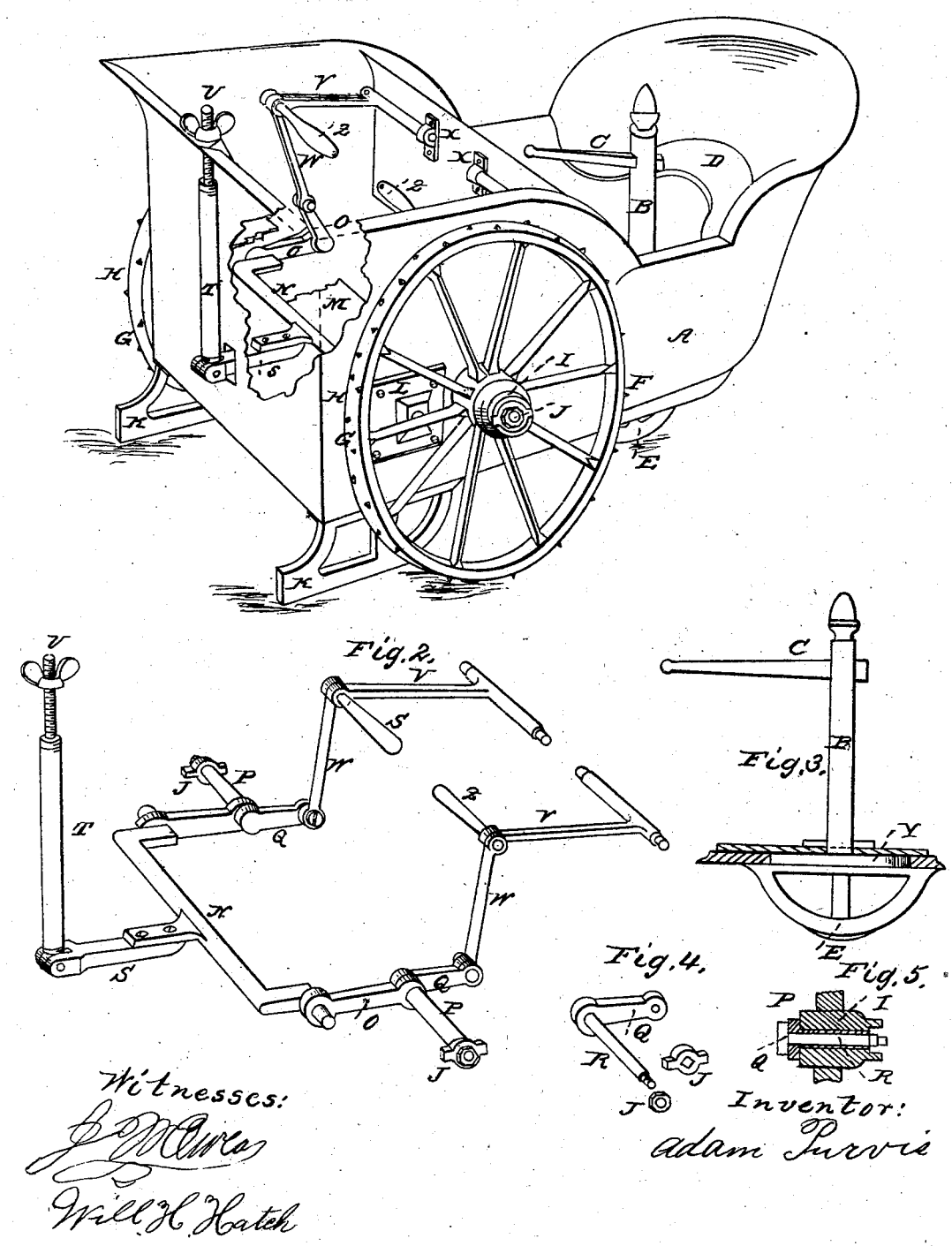

United States Patent Office.

ADAM PURVIS, OF LOUISVILLE, KENTUCKY.

Letters Patent No. 93,833, dated August 17, 1869.

IMPROVED ICE-VELOCIPEDE.

The Schedule referred to in these Letters Patent and making part of the same.

*To all whom it may concern:*

Be it known that I, ADAM PURVIS, of the city of Louisville, county of Jefferson, and State of Kentucky, have invented a new and useful Improvement in Ice-Sleighs; and I do hereby declare that the following is a full, clear, and exact description thereof.

The sleigh to which my improvements are applied is constructed in the ordinary manner, except that it has two runners behind and only one in front, which is attached to a wheel sunk in the bottom of the sleigh, so that it may revolve.

Both ends of the runner are turned up in the shape of a half circle, having a small cutter in the bottom, in order to catch the ice, for the purpose of steering, which is done by a shaft attached to the runner-wheel below, and passing up through the sleigh, with a lever through the top, by which it is operated or turned at pleasure.

On either side of the sleigh are wheels, similar to those of a carriage, the faces of which are closely set with iron or steel-pointed pins, so as to catch the ice, for the purpose of propelling the machine; and in order to accommodate the wheels when passing over the uneven surface of the ice, the axles on which they are hung are made in the shape of a crank-shaft, extending across, and supported at the ends by bearings, in the sides of the sleigh, having a crank on either end inside of the bearings, and in the ends of which there are hollow axles inserted securely, on which the wheels are hung, and, by means of the cranks, permitted to rise up and down, and through the openings of said axle the spindles of the driving-cranks pass, having a clutch on the end, which takes hold of the out end of the hub of the wheels by which they are driven, which is done by the application of hand or other power to the levers inside of the sleigh, which connects with the driving-cranks below, and by which the machine is propelled, the above-named crank-shaft having an arm in the centre, extending out through the back of the sleigh, with a gum-elastic spring attached thereto, running up through the back of the sleigh, with a screw at the top, in order to regulate the pressure of the wheels on the ice, and to prevent the wheels from raising the sleigh up, when passing over any uneven surface.

My improvements in sleighs, of the kind above described, consist in providing the crank-shaft, which is connected with the hollow axles, with an arm, and a spring, which can be regulated so as to increase or diminish the penetration of the spikes in the wheel; also, in the combination of the several parts composing the propelling-mechanism; and, finally, in combining, with said propelling-mechanism, clutches and fastening-nuts, whereby the wheels and axles are connected together, as will be hereinafter fully set forth.

To enable others skilled in the art to make and use my invention, I will proceed to describe its construction and operation, by reference to the drawings, and to the letters of reference marked thereon, in which—

Figure 1 is a perspective view of the sleigh, showing how the wheels and front of the interior are arranged.

A is the body of the sleigh, which is made of wood or other material.

B is the steering-shaft, which is made of wood or iron.

C is the lever, by which it is operated.

D is the front seat.

E is the front runner, which is made of iron.

F is the driving-wheel, which is made of wood, except the band G and the pins H, in the face, which are made of iron or steel.

I is the hub of the wheel.

J is the clutch and screw, by which the wheel is driven.

K K are the two hind runners, also made of iron, and screwed to the bottom of sleigh.

L is the bearing of the crank-shaft N.

M is the back seat.

N is the crank-shaft, and is made of iron.

O are the cranks, also made of iron.

P P are the hollow axles, on which the wheels are hung, and are made of thick wrought-iron pipe.

Q Q are the driving-cranks, which are made of iron.

R R are the spindles of the same, to which the driving-clutch J is attached.

S is the arm of the crank-shaft, running through the back of the sleigh, and is made of iron also.

T is the gum spring attached thereto.

U is the screw on the top, by which the pressure of the wheels is regulated.

V and W are the levers and pitmen, by which the cranks Q Q are operated, and all of which are made of iron, with the ends of the levers attached to the back of the seat by journal-boxes at X.

Figure 2 is a perspective view of the crank-shaft, showing its general arrangement.

N is the shaft.

O O are the cranks.

P P are the hollow axles, on which the wheels are hung.

Q Q are the driving-cranks.

J J are the clutches on the ends.

V V and W W are the levers and pitmen, by which the cranks are operated.

S is the arm to which the gum spring is attached.

T is the gum spring.

U is the screw by which the pressure is regulated.

Figure 3 is a view of the front runner, and wheel to which it is attached, showing how it is set in the bottom of the sleigh, and also, how the shaft is attached to it by which it is operated.

E is the runner.

Y is the wheel to which it is secured.

B is the shaft.

C is the lever by which it is operated.

Figure 4 is a view of the driving-crank Q, showing the nut and clutch J, on the end of the spindle.

Figure 5 is a view of the hub I, cut through the centre, showing the axle P, and how the spindle passes through it.

The above fully describes the construction of my invention or improvement, and is operated simply by applying power to the handle of the levers Z Z, which puts the machine in motion, and is guided by the lever C in front.

I do not claim anything as original in the construction of the seigh; but

What I do claim as my invention or improvement, and desire to secure by Letters Patent, is—

1. The crank-shaft N, with its arm S, gum spring T, screw U, cranks O O, and hollow axles P P.

2. The levers V V, pitmen W W, handles z z, cranks Q, cranks O, with hollow axles P, crank-shaft N, with arm S, spring T, screw U, and nut, all arranged substantially as herein described, and operated by hand, in combination with each other, with the body of the sleigh, and with the drive-wheels, as set forth.

3. Also, in combination with the parts named in the last claim, the clutches J and fastening-nuts, as set forth.

ADAM PURVIS.

Witnesses:
J. W. OWEN,
WILL. H. HATCH.